United States Patent
Uwabo et al.

[11] Patent Number: 6,091,575
[45] Date of Patent: Jul. 18, 2000

[54] MAGNETIC HEAD SUPPORT MECHANISM FOR A FLEXIBLE DISC DRIVE

[75] Inventors: Tsuneo Uwabo, Hachiouji; Yoshihiro Okano; Eiichi Yoneyama, both of Atsugi; Yoshinori Tangi, Hachiouji, all of Japan

[73] Assignee: Mitsumi Electric Co., Ltd., Tokyo, Japan

[21] Appl. No.: 09/137,441

[22] Filed: Aug. 20, 1998

[30] Foreign Application Priority Data

Aug. 22, 1997 [JP] Japan ................................. 9-226360

[51] Int. Cl.[7] .................................................. G11B 21/20
[52] U.S. Cl. ............................................................. 360/104
[58] Field of Search ............................. 360/99.01, 104, 360/105, 106, 109

[56] References Cited

U.S. PATENT DOCUMENTS

| | | | |
|---|---|---|---|
| 4,882,644 | 11/1989 | Kimura et al. | 360/104 |
| 4,901,176 | 2/1990 | Kuzuhara | 360/104 |
| 4,912,582 | 3/1990 | Gomi et al. | 360/99.01 |
| 4,972,281 | 11/1990 | Fujioka | 360/105 |
| 5,023,735 | 6/1991 | Kuzuhara | 360/104 |
| 5,786,968 | 7/1998 | Osaka | 360/104 |

*Primary Examiner*—Jefferson Evans
*Attorney, Agent, or Firm*—Frishauf, Holtz, Goodman, Langer & Chick, P.C.

[57] ABSTRACT

An upper magnetic head 71 is supported on an upper gimbal plate 66 about an upper pivot 63-1 to allow swing of the upper magnetic head 71. A lower magnetic head 72 is supported on a lower gimbal plate 67 about a lower pivot 64-1 to allow swing of the lower magnetic head 72. The upper pivot 63-1 is resiliently held on an upper carriage 61 with an upper pivot spring 63. The lower pivot 64-1 is resiliently held on a lower carriage 62 with a lower pivot spring 64.

10 Claims, 5 Drawing Sheets

MAGNETIC HEAD SUPPORT MECHANISM FOR A FLEXIBLE DISC DRIVE

BACKGROUND OF THE INVENTION

The present invention relates to a linear moving type carriage assembly for use in disk drives and, more particularly, to a magnetic head support mechanism for supporting upper and lower magnetic heads that write/read data on a magnetic disk medium in a flexible disk. As is well known in the art, disk drives are a type of a magnetic data recording/reproducing device on which a flexible disk can be mounted for the purpose of recording and reproducing data. Flexible disks have recently been increased in storage capacity. Typical flexible disks have a normal storage capacity between 1 and 2 megabytes. There flexible disks with a storage capacity of 128 megabytes have recently been developed. Such flexible disks are referred hereinafter to as flexible disks of the large capacity. In response to such a trend, disk drives have also been developed that can be used with the flexible disk of the large capacity.

The disk drives used With a flexible disk of the normal capacity have different mechanisms from those of the large capacity. One of the differences lies in the structure of driving unit for use in driving a carriage adapted to support a magnetic head in a manner to allow swing thereof. The carriage is for use in moving the magnetic head in a predetermined radial direction relative to the flexible disk mounted within the disk drive. The disk drive for the normal-capacity flexible disk uses a stepping motor as the driving unit. On the other hand, the disk drive for the large-capacity flexible disk uses as the driving unit a linear motor that is called a voice coil motor.

The voice coil motor is mounted on a rear portion of a carriage assembly. The voice coil motor comprises a voice coil and a magnetic circuit. The voice coils are wound around a drive shaft that is arranged in parallel with the predetermined radial direction. The magnetic circuit is used in generating a magnetic field in a direction intersecting that of electric current flowing through the voice coil. With this configuration, the interaction between the electric current and the magnetic field produces a driving force on the voice coil in the extending direction of the drive shaft when the electric current flows through the voice coil in the direction intersecting that of the magnetic field generated by the magnetic circuit. The voice coil motor can thus move the carriage assembly with the driving force in the predetermined radial direction.

As is known in the art, the flexible disks include a cover consisting of an upper cover section and a lower cover section, and a magnetic disk medium contained in the cover. Upper and lower access slots are formed in the upper and the lower cover sections, respectively, at a corresponding location. The magnetic disk medium is accessed by upper and lower magnetic heads through the upper ad the lower access slots, respectively. The surface of the magnetic disk medium is divided into a number of concentric circles. Each concentric circle is called a track and is used to store the data. The tracks on the large capacity flexible disk are smaller in width than those of the normal capacity.

The magnetic disk medium in the flexible disk of the normal capacity is rotated typically at a rotation speed of 300 rpm while the one of the large capacity is rotated at 3,600 rpm. The magnetic disk medium rotates at a high speed in the flexible disk of the large capacity. It is thus necessary to avoid direct contact between the upper and the lower magnetic heads and the magnetic disk medium while writing and reading data. For example, the flexible disk of the large capacity requires a gap of approximately several ten nanometers between the upper and the lower magnetic heads and the magnetic disk medium. The magnetic disk medium in the flexible disk of the large capacity is moved upward and downward like wave when it is rotated at a high speed, because of flexibility of the magnetic recording medium itself.

As is well known in the art, in hard disk drives, the magnetic disk medium is incorporated in the magnetic recording/reproducing device. The magnetic head is supported by a support spring that is called a load arm. The magnetic head comprises a core and a slider. The core is for use in recording data on the magnetic disk medium. The slider is for floating the core over the surface of the magnetic disk medium with a small gap called spacing. The magnetic head of the type described is called a monolithic head. It is not assumed for the hard disk drive that the magnetic disk medium is moved upward and downward during rotation. In the case that the above-mentioned support mechanism is used for the magnetic head, the magnetic head is displaced out of a predetermined track position over the magnetic disk medium when the magnetic disk medium is flexible like the one in the flexible disk.

Taking the above into consideration, the applicant of the present invention has proposed a linear moving type carriage assembly for flexible disk drives" in Japanese Patent Laid Open No. Tokkai Hei 9-312055 (312055/1997). This carriage assembly is described with reference to FIG. 1.

Figure 1:
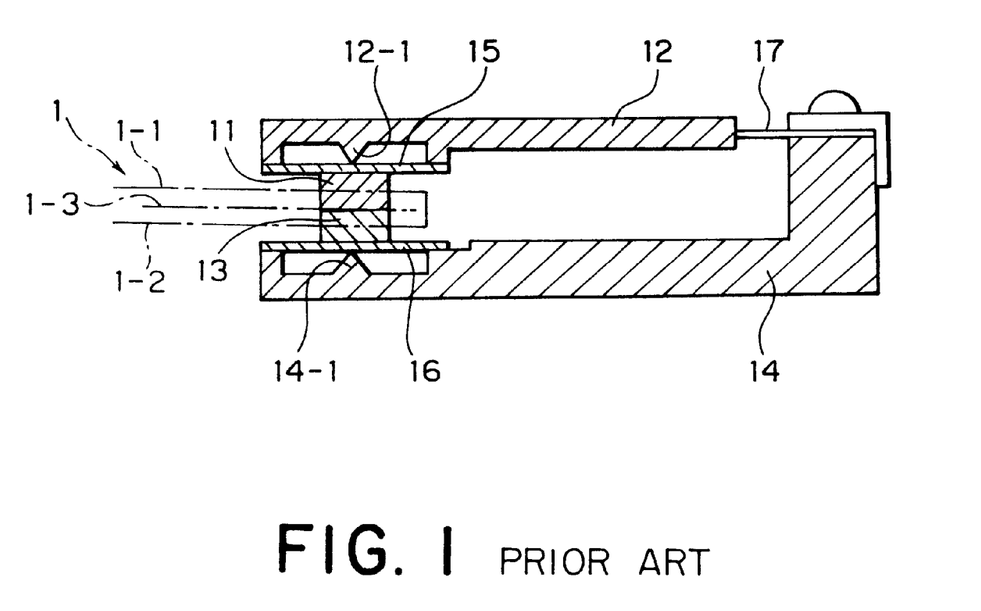
FIG. 1 is a cross-sectional view showing a conventional linear moving type carriage assembly with a flexible disk.

In FIG. 1, a flexible disk 1 mounted on a flexible disk drive is depicted by a dot-dash line. The flexible disk 1 comprises a case with an upper case member 1-1 and a lower case member 1-2, and a magnetic disk medium 1-3 contained in the case. An upper magnetic head 11 is for recording and reproducing data through an upper access slot in the upper case ember 1-1. The upper magnetic head 11 is supported on an upper carriage 12 at an end thereof. A lower magnetic head 13 is for recording and reproducing data through a lower access slot in the lower case member 1-2. The lower magnetic head 13 is supported on a lower carriage 14 at an end thereof. Strictly speaking, the upper carriage 12 comprises an upper pivot 12-1 and an upper gimbal plate 15 at an end thereof. The upper magnetic head 11 is held by the upper gimbal plate 15 about the upper pivot 12-1 to allow swing of the upper magnetic head 11. Likewise, the lower carriage 14 comprises a lower pivot 14-1 and a lower gimbal plate 16 at an end thereof. The lower magnetic head 13 is held by the lower gimbal plate 16 about the lower pivot 14-1 to allow swing of the lower magnetic head 13. A bias spring (head load spring) 17 applies a predetermined downward urging force to the upper magnetic head 11.

With this structure, the upper and the lower magnetic heads 11 and 13 swing about the upper and the lower pivots 12-1 and 14-1, respectively, even when the magnetic disk medium 1-3 floats up and down This makes the upper and the lower magnetic heads 11 and 13 follow the wavy movement of the magnetic disk medium 1-3. For a flexible disk of a large capacity, a predetermined gap can be kept between the upper and the lower magnetic heads 11 and 13 and the magnetic disk medium 1-3 while rotating at a high speed. The upper and the lower magnetic heads 11 and 13 are held at a predetermined track position over the magnetic disk medium 1-3 even with the up-and-down movement of the magnetic disk medium 1-3 during rotation.

However, the following problems arise because the upper carriage 12 is attached to the lower carriage 14 through the head load spring 17. An external force such as vibration and shock tends to vibrate the upper magnetic head 11 with the substantially no movement of the lower magnetic head 13. As a result, opposing relation is not stable between the surface of the magnetic disk medium 1-3 and the head face of at least one of the upper and the lower magnetic heads 11 and 13. Such an unstable opposing relation makes it difficult to improve the accuracy of the magnetic head output.

SUMMARY OF THE INVENTION

Therefore, an object of the present invention is to provide a magnetic head support mechanism for a flexible disk drive that ensures stable opposing relation between a head face and a surface of a magnetic disk medium, thereby providing a magnetic head output with high accuracy, even with an external force such as vibration and shock.

Another object of the present-invention is to provide a magnetic head support mechanism for a flexible disk drive that ensures a predetermined gap between upper and lower magnetic heads and a magnetic disk medium rotating at a high speed even when the magnetic disk medium is a flexible disk of a large capacity to be rotated at a high speed.

Yet another object of the present Invention is to provide a magnetic head support mechanism for a flexible disk drive that can prevent upper and lower magnetic heads from being displaced out of a predetermined track position on a magnetic disk medium in case of up-and-down movement of the magnetic disk medium during rotation.

It is still another object of the present invention to provide a magnetic head support mechanism for a flexible disk drive that provides a stable magnetic head output while reducing vibration against upper and lower magnetic heads during rotation of a magnetic disk medium.

It is yet another object of the present invention to provide a flexible disk drive utilizing one of the above mentioned magnetic head support mechanisms for a flexible disk drive.

A magnetic head support mechanism for a flexible disk drive according to the present invention comprises upper and lower magnetic heads supported on upper and lower carriages, respectively, at one end thereof, for recording and reproducing data on and from a magnetic disk medium in. a flexible disk.

According to an aspect of the present invention, the magnetic head support mechanism further comprises an upper gimbal plate for use in supporting the upper magnetic head about an upper pivot to allow swing of the upper magnetic head; a lower gimbal plate for use in supporting the lower magnetic head about a lower pivot to allow swing of the lower magnetic head; and a lower pivot spring for resiliently holding the lower pivot on the lower carriage.

DESCRIPTION OF THE PREFERRED EMBODIMENTS

Figure 2:
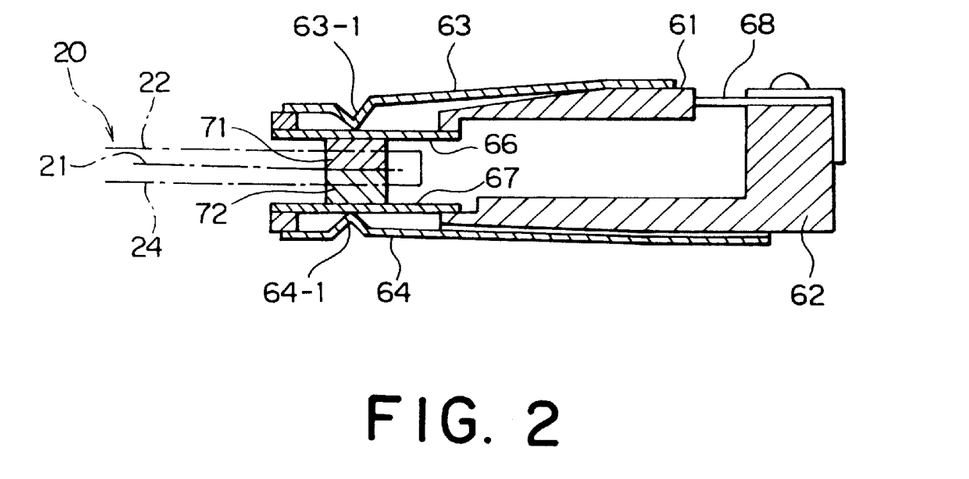
FIG. 2 is a cross-sectional view showing essentials of a linear moving type carriage assembly with a flexible disk, the carriage assembly having a magnetic head support mechanism according to a first embodiment of the present invention.
Figure 3:
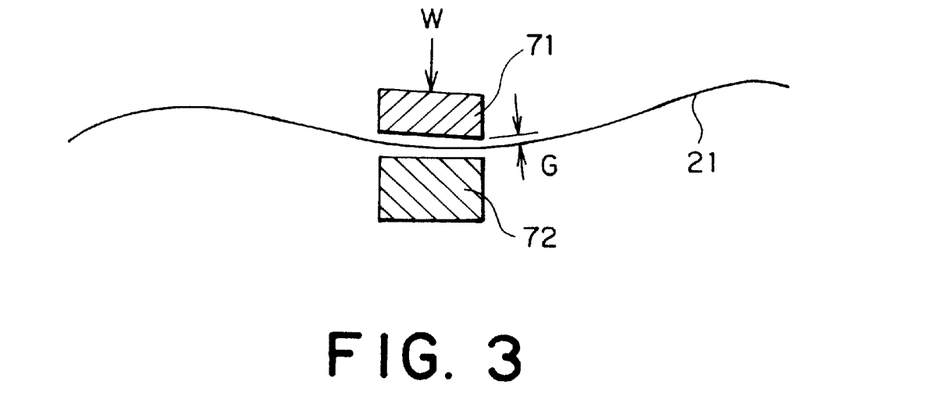
FIG. 3 is a schematic cross-sectional view for use in describing operation of the linear moving type carriage assembly in FIG. 2.
Figure 4:
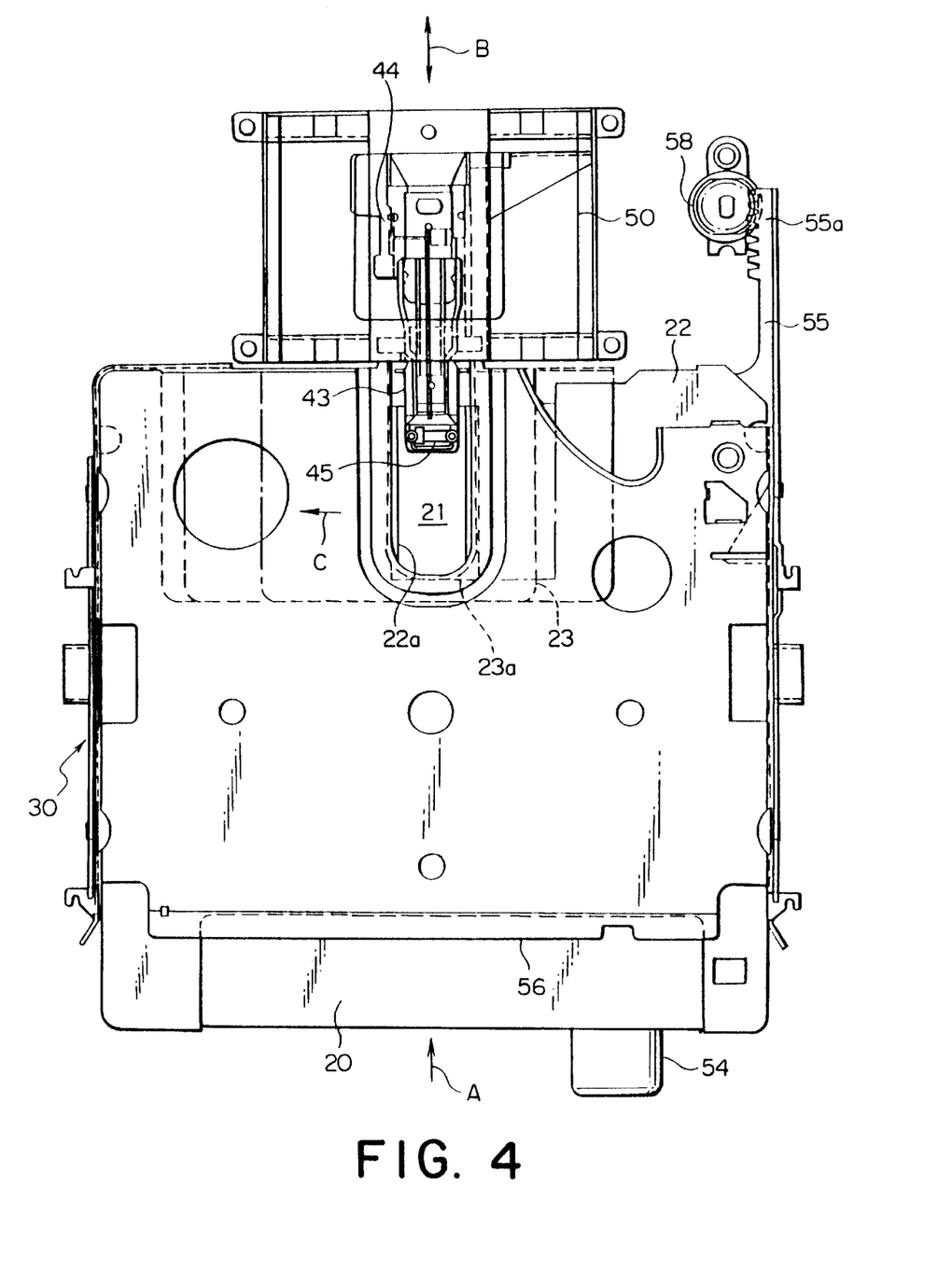
FIG. 4 is a plan view showing a flexible disk drive to which the present invention is applied.

Referring to FIGS. 2 through 7, a flexible disk drive with a magnetic head support mechanism is described. This flexible disk drive can be used for flexible disks of a large capacity, as well as those of a normal capacity. In FIG. 4, the flexible disk drive is a magnetic data recording/reproducing device on which a flexible disk 20 can be mounted for the purpose of recording and reproducing data. The flexible disk drive comprises a main chassis 30. The flexible disk 20 is inserted into the flexible disk drive in the direction depicted by an arrow A in FIG. 4. The flexible disk 20 loaded on the disk drive is supported over a disk table assembly (not shown) that is in turn supported rotatably on the side of the surface of the main chassis 30, with the flexible disk 40 being coaxial with the disk table assembly.

The flexible disk 20 comprises a circular magnetic disk medium 21, an upper case member 22, a lower case mummer (depicted by 24 in FIG. 2), an upper shutter 23, and a lower shutter (not shown). The upper and the lower case members 22 and 24 are for covering the magnetic disk medium 21 and have an upper access slot 22a and a lower access slot (not shown), respectively. The upper shutter 23 and the lower shutter are slidable in the direction depicted by an arrow C. The upper shutter 23 and the lower shutter are provided with an upper window 23a and a lower window (not shown), respectively. The upper shutter 23 and the lower shutter are biased with a spring (not shown) in the direction opposite to the direction depicted by the arrow C. The upper window 23a in the upper shutter 23 and the lower window in the lower shutter are over the positions corresponding to the upper access slot 22a in the upper case member 22 and the lower access slot (not shown) in the lower case member 24, respectively, when the upper shutter 23 and the lower shutter move in the direction depicted by the arrow C. As a result, the upper and the lower magnetic heads are allowed to access to the magnetic disk medium 21 through the upper access slot 22a and the lower access slot, respectively.

The disk table assembly is rotation-driven by a drive motor (not shown) provided on the backside of the main chassis 30. In this structure, the magnetic disk medium 21 in the flexile disk 20 rotates A printed circuit board (not shown) on which a number of electronic parts are mounted is also provided on the backside of the main chassis 30.

Figures 5, 6:
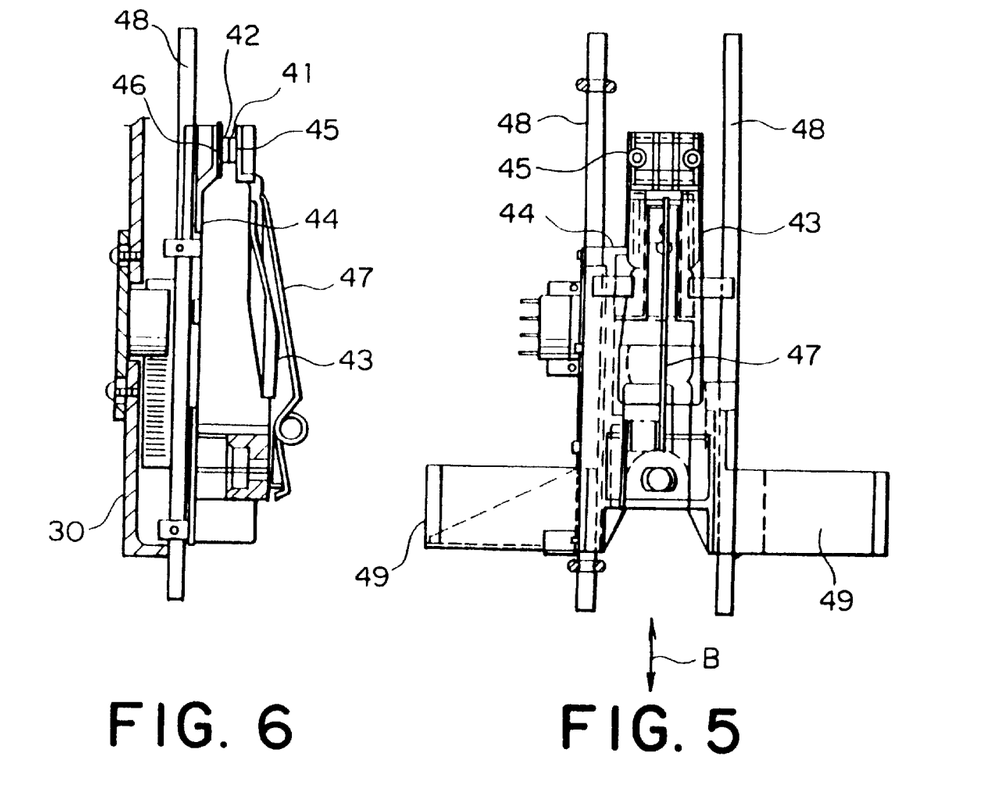
FIG. 5 is a plan view of a linear moving type carriage assembly used in FIG. 4.
FIG. 6 is a right side view of a linear moving type carriage assembly used in FIG. 4.
Figure 7:
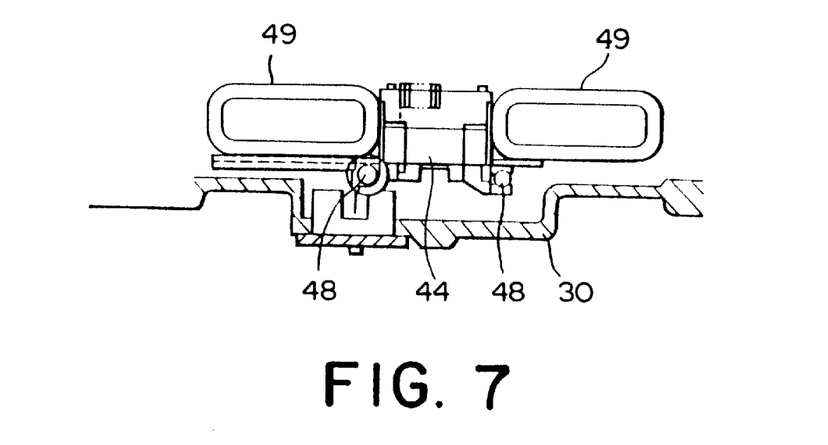
FIG. 7 is a rear view of a linear moving type carriage assembly used in FIG. 4.

As shown in FIGS. 5 through 7, an upper magnetic head 41 is held by an upper gimbal plate 45 on an upper carriage 43 at an end thereof to allow swing of the upper magnetic head 41. Likewise, a lower magnetic head 42 is held by a lower gimbal plate 46 on a lower carriage 44 at an end thereof to allow swing of the lower magnetic head 42. A bias spring (head load spring) 47 attached to the upper carriage 43 applies a predetermined downward urging force to the upper magnetic head 41. A linear moving type carriage assembly herein used is a combination of the bias spring 47, the upper and the lower carriages 43 and 44, and the mechanism for supporting the upper and the lower magnetic heads 41 and 42. The linear moving tape carriage assembly is placed on the top surface of the main chassis 30 with a gap from the latter. The linear moving type carriage assembly holds the upper and the lower magnetic heads 41 and 42 such that the magnetic heads 41 and 42 are moved with respect to the flexible disk 20 in a predetermined radial direction (the direction depicted by an arrow B in FIG. 4) of the flexible disk 20.

The lower carriage 44 is supported and guided at the lower ends thereof by a pair of guide bars 48 extending in the predetermined radial direction B.

The upper carriage 43 and the lower carriage 44 are driven in the radial direction B by a voice coil motor described below. The voice coil motor is placed on a rear portion of the carriage assembly. More specifically, the voice coil motor is arranged back of the linear moving type carriage assembly. The voice coil motor comprises a pair of voice coils 49 and a magnetic circuit 50 (FIG. 4). The voice coils 49 are wound around a drive shaft that is arranged in parallel with the predetermined radial direction B. The magnetic circuit 50 is for use in generating magnetic field in a direction intersecting that of electric current flowing through the voice coils 49. The interaction between the electric current and the magnetic field produces a driving force on the voice coils 49 in the extending direction of the drive shaft when electric current flows through the voice coils 49 in the direction intersecting that of the magnetic field generated by the magnetic circuit 50. The voice coil motor can thus move the carriage assembly with the driving force in the predetermined radial direction B.

Turning back to FIG. 4, the disk drive further comprises a shutter driving mechanism, an ejector mechanism, and a carriage locking mechanism. The shutter driving mechanism is for use in moving an upper shutter 23 and a lower shutter provided on the flexible disk 20. The ejector mechanism is for ejecting the flexible disk 20 out of the disk drive. The carriage locking mechanism is for locking the carriage assembly after the flexible disk 20 is ejected out of the disk drive.

The lever unit which is not shown comprises an ejection lever and a locking lever. The ejection lever serves as an element of the shutter driving mechanism for use in moving the upper shutter 23 and the lower shutter and as an element of the ejector mechanism for ejecting the flexible disk 20 out of the disk drive. The locking lever is placed near the carriage assembly for locking the carriage assembly when the flexible disk is ejected.

The ejector mechanism comprises an ejection button 54 that is projected outward from a front bezel (not shown) of the disk drive. The ejector mechanism further comprises an ejection plate 55 and an ejection spring (not shown). The ejection spring is connected to the ejection plate 55 at one end and to a disk holder unit 56 at the other end. The ejection plate 55 comprises a rack 55a at an end hereof. The rack 55a engages with a pinion 58 that is rotatably supported over the surface of the main chassis 30. The lever unit is biased by a spring mechanism (not shown) in the counter-clockwise direction.

It is assumed that the flexible disk 20 is loaded on the disk holder unit 56 of the disk drive as shown in FIG. 4 by means of pushing the flexible disk 20 in the direction depicted by the arrow A in FIG. 4. The end of the ejection lever then engages with the upper right edge of the upper shutter 23 and that of the lower shutter. This rotates the lever unit in the clockwise direction when the flexible disk 20 moves. The clockwise rotation of the lever unit causes the end of the ejection lever to push the upper shutter 23 and the lower shutter and slide in the direction depicted by the arrow C.

When the flexible disk 20 is contained completely in the disk holder unit 56 of the disk drive, the flexible disk 20 is held by the disk holder unit 56 by means of a disk locking mechanism which is not shown. In this state, the upper window 23a formed in the upper shutter 23 is positioned just above the upper access slot 22a formed in the upper case member 22. The lower window provided in the lower shutter is positioned just beneath the lower access slot provided in the lower case member. The upper shutter 23 and the lower shutter are biased by a spring member (not shown) such that they are held at a position depicted by a dot-dash line in FIG. 4.

As described in conjunction with FIGS. 5 through 7, the linear moving type carriage assembly accesses to the magnetic disk medium 21 in the flexible disk 20 loaded on the disk holder unit 56 of the flexible disk drive in FIG. 4. This access is achieved with the upper and the lower magnetic heads 41 and 42 through the upper access slot 22a in the upper case member 22 and the lower access slot in the lower case member, respectively. The upper and the lower magnetic heads 41 and 42 are supported by a magnetic head support mechanism described more in detail below on the upper and the lower carriages 43 and 44 at the ends thereof.

Referring to FIG. 2, a linear moving type carriage assembly is described in detail that has a magnetic head support mechanism for a flexible disk drive according to a first embodiment of the present invention. The linear moving type carriage assembly is slightly different from the one illustrated in FIGS. 5 through 7. An upper pivot spring 63 and a lower pivot spring 64 are fixed at their ends to upper and lower carriages 61 and 62, respectively, having a high rigidity. An upper pivot 63-1 is provided near the other end of the upper pivot spring 63. The upper pivot 63-1 is projected towards the flexible disk 20. A lower pivot 64-1 is provided near the other end of the lower pivot spring 64. The upper pivot 64-1 is projected towards the flexible disk 20. The upper and the lower pivots 63-1 and 64-1 are formed by means of deforming a portion of the upper and the lower pivot springs 63 and 64, respectively. The upper and the lower pivots 63-1 and 64-1 are resiliently held by the upper and the lower carriages 61 and 62, respectively, with the upper and the lower pivot springs 63 and 64, respectively. The position of the upper and the lower pivots 63-1 and 64-1 are selected to correspond to upper and lower magnetic heads 71 and 72, respectively. Upper and lower gimbal plates 66 and 67 are attached to the upper and the lower carriages 61 and 62 at their other ends, respectively. The upper magnetic head 71 is held on the upper gimbal plate 66 and is allowed to swing about the upper pivot 63-1. Likewise, the lower magnetic head 72 is held on the lower gimbal plate 67 and is allowed to swing about the lower pivot 64-1. A bias spring 68 applies a downward urging force W (FIG. 3) against the upper magnetic head 71.

The upper and the lower pivot springs 63 and 64 may be made of a leaf spring or a linear spring made of a metal, a plastic, or a combination thereof. It is preferable that the upper and the lower pivots 63-1 ad 64-1 are designed to be resiliently movable or displaceable by 0.3 mm in maximum.

During rotation of the magnetic disk medium 21 in the flexible disk 20 loaded on the flexible disk drive, the magnetic disk medium 21 is expected to move up and down along a wavy path. Even in such a case, the upper and the lower magnetic heads 71 and 72 swing about the upper and the lower pivots 63-1 and 64-1, respectively, with the motion of the magnetic disk medium 21, as shown in FIG. 3. When the flexible disk 20 is that of a large capacity and the magnetic disk medium 21 rotates at a high speed, the upper and the lower magnetic heads 71 and 72 are apart from the magnetic disk medium 21 at a predetermined gap G as shown In FIG. 3. Furthermore, the upper and the lower magnetic heads 71 and 72 are held at a predetermined track position over the magnetic disk medium 21 even with the wavy motion of the magnetic disk medium 21 during rotation. In other words, it is possible to prevent the upper and the lower magnetic heads 71 and 72 from displacing out of the predetermined track position.

With an external force such as vibration or shock, the upper and the lower pivot springs 63 and 64 resiliently deform, causing displacement of the upper and the lower pivots 63-1 and 64-1, respectively. This allows integral vibration of the upper and the lower magnetic heads 71 and 72. Accordingly, the opposing relation is maintained in a relatively stable state between the head faces of the upper and the lower magnetic heads 71 and 72 and the magnetic disk medium 21. The magnetic head output can be improved easily in accuracy.

Figure 8:
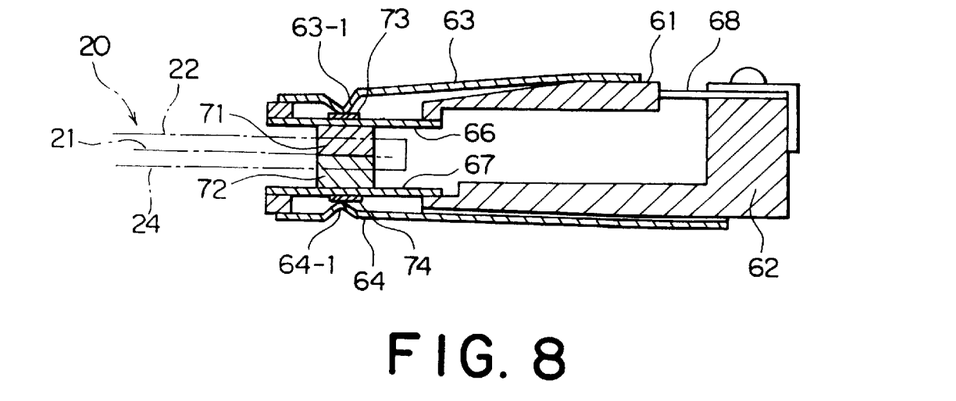
FIG. 8 is a cross-sectional view showing a modification of the magnetic head support mechanism in FIG. 2.

Referring to FIG. 8, modification of the magnetic head support mechanism in FIG. 2 is described. This modification provides a cushioning material 73 between the upper pivot 63-1 and the upper gimbal plate 66 and a cushioning material 74 between the lower pivot 64-1 and the lower gimbal plate 67. The cushioning materials 73 and 74 may be a rubber-based elastic sheet material having good shock resistance, such as silicone and urethane. Alternatively, they may be an elastic sheet material of a synthetic resin such as Teflon, polyvinyl chloride, and polyethylene. The elastic sheet material is adhered and fixed to the surface of the upper and the lower gimbal plates 66 and 67 on the side of the upper and the lower pivots 63-1 and 64-1, respectively.

With the cushioning material 73, the gap is eliminated between the upper gimbal plate 66 and the upper pivot 63-1. As a result, any vibration from the upper gimbal plate 66 can be normally absorbed by the upper pivot spring 63 via the upper pivot 63-1. This means that the vibration from the upper magnetic head 71 is absorbed by the upper pivot spring 63 through the cushioning material 73, improving vibration characteristics of the upper magnetic head 71. Likewise, the cushioning material 74 eliminates the gap between the lower gimbal plate 67 and the lower pivot 64-1. As a result, any vibration from the lower gimbal plate 67 can be normally absorbed by the lower pivot spring 64 via the lower pivot 64-1. This means that the vibration from the lower magnetic head 72 is absorbed by the lower pivot spring 64 through the cushioning material 74, i=roving vibration characteristics of the lower magnetic head 72. Accordingly, the upper and the lower magnetic heads 71 and 72 receive less vibration even during high-speed rotation of the magnetic disk medium 21. The upper and the lower magnetic heads 71 and 72 thus provide stable magnetic head outputs.

In the modification in FIG. 8, the cushioning material 73 is provided between the upper gimbal plate 66 and the upper pivot 63-1 while the cushioning material 74 is provided between the lower gimbal plate 67 and the lower pivot 64-1. However, the cushioning material may be provided either the upper or the lower combination.

Figure 9:
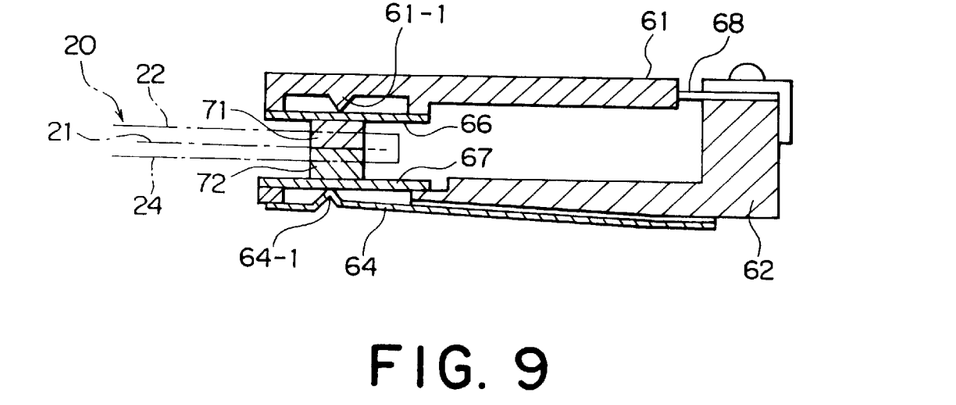
FIG. 9 is a cross-sectional view showing essentials of a linear moving type carriage assembly with a flexible disk, the carriage assembly having a magnetic head support mechanism according to a second embodiment of the present invention.

Referring to FIG. 9, a linear moving type carriage assembly having a magnetic head support mechanism according to a second embodiment of the present invention is described. The linear moving type carriage assembly comprises an upper pivot 63-1 that is integrally formed with or separately formed and fixed to an upper carriage 61. Other components and parts are similar to the linear moving type carriage assembly in FIG. 2.

In the linear moving type carriage assembly in FIG. 9, the bias spring 68 and a lower pivot spring 64 resiliently deform in response to an external force such as vibration or shock to move the upper and the lower pivots 63-1 and 64-1. This means that the upper and the lover magnetic heads 71 and 72 vibrate integrally. Accordingly, the opposing relation is maintained in a relatively stable state between the head faces of the upper and the lower magnetic heads 71 and 72 and the magnetic disk medium 21. The magnetic head output can be improved easily in accuracy. Other operations are similar to those in the linear moving type carriage assembly in FIG. 2.

Figure 10:
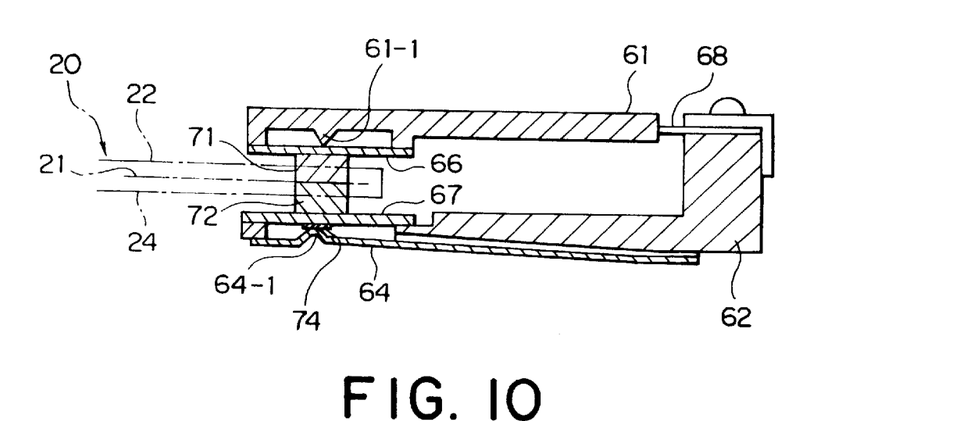
FIG. 10 is a cross-sectional view showing a modification of the magnetic head support mechanism in FIG. 9.

Referring to FIG. 10, a linear moving type carriage assembly with a magnetic head support mechanism modified from the embodiment in FIG. 9 in described. This modification provides a cushioning material 74 only between the lower pivot 64-1 and the lower gimbal plate 67, which is a difference from the embodiment in FIG. 9. The cushioning material 74 provides absorption of the vibration from the lower magnetic head 72 by the lower pivot spring 64 through the cushioning material 74, improving vibration characteristics of the lower magnetic head 72. Accordingly, the upper and the lower magnetic heads 71 and 72 receive less vibration even during high-speed rotation of the magnetic disk medium 21. The upper and the lower magnetic heads 71 and 72 thus provide stable magnetic head outputs.

It is understood that the present invention is not limited to the above mentioned embodiments and may be changed, modified, or altered without departing from the spirit and scope of the present invention. For example, the bias spring described above is not the only limitation of the means to provide a predetermined downward urging force against the upper magnetic head. Similar alternatives may be equally used. In addition, at least one of the upper and the lower pivots may be formed separately from the upper and the lower pivot springs and be secured later thereto.

What is claimed is:

1. A magnetic head support mechanism for a flexible disc drive comprising:

upper and lower magnetic heads for recording and reproducing data on and from a magnetic disc medium in a flexible disc;

upper and lower cartridges that support said upper and said lower magnetic heads, respectively, at one end thereof;

an upper gimbal plate coupled to said upper carriage for use in supporting said upper magnetic head about an upper pivot to allow swing of said upper magnetic head;

a lower gimbal plate coupled to said lower carriage for use in supporting the lower magnetic head about a lower pivot to allow swing of the lower magnetic head;

a lower pivot spring for resiliently holding said lower pivot on said lower carriage; and a lower cushioning material member interposed between said lower pivot and said lower gimbal plate, said lower cushioning material member being a shock resistant elastic sheet material and being fixed to a surface of said lower gimbal plate on the side of said lower pivot so that it eliminates a gap between said lower gimbal plate and said lower pivot, said lower pivot being resiliently movable by at most 0.3 mm.

2. A magnetic head support mechanism for a flexible disc drive as defined by claim 1, further comprising an upper pivot spring for use in resiliently holding said upper pivot on said upper carriage.

3. A magnetic head support mechanism for a flexible disc drive as defined by claim 2, further comprising an upper cushioning material member interposed between said upper pivot and said upper gimbal plate, said upper cushioning material member being the shock resistant elastic sheet material and being fixed to a surface of said upper gimbal plate on the side of said upper pivot so as to eliminate the gap between said upper gimbal plate and said upper pivot, said upper pivot being resiliently movable by at most 0.3 mm.

4. A flexible disc drive comprising an upper magnetic head and a lower magnetic head that are supported by a magnetic head support mechanism for a flexible disc drive as defined by claim 3.

5. A flexible disc drive comprising an upper magnetic head and a lower magnetic head that are supported by a magnetic head support mechanism for a flexible disc drive as defined by claim 2.

6. A magnetic head support mechanism for a flexible disc drive as claimed in claim 1, wherein said upper pivot is directly provided on said upper carriage.

7. A flexible disc drive comprising an upper magnetic head and a lower magnetic head that are supported by a magnetic head support mechanism for a flexible disc drive as defined by claim 6.

8. A magnetic head support mechanism for a flexible disc drive as defined by claim 1, further comprising a biasing device which biases said upper carriage to apply a downward urging force to said upper magnetic head.

9. A flexible disc drive comprising an upper magnetic head and a lower magnetic head that are supported by a magnetic head support mechanism for a flexible disc drive as defined by claim 8.

10. A flexible disc drive comprising an upper magnetic head and a lower magnetic head that are supported by a magnetic head support mechanism for a flexible disc drive as defined by claim 1.

* * * * *